(12) United States Patent
Owechko

(10) Patent No.: US 6,642,887 B2
(45) Date of Patent: Nov. 4, 2003

(54) COOPERATIVE MOBILE ANTENNA SYSTEM

(75) Inventor: Yuri Owechko, Newberry Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/799,821

(22) Filed: Feb. 28, 2001

(65) Prior Publication Data

US 2001/0033248 A1 Oct. 25, 2001

Related U.S. Application Data

(60) Provisional application No. 60/185,903, filed on Feb. 29, 2000.

(51) Int. Cl.[7] .............................. H01Q 3/22; H01Q 3/24; H01Q 3/26
(52) U.S. Cl. ........................................ 342/373; 342/378
(58) Field of Search ................................. 342/373, 378

(56) References Cited

U.S. PATENT DOCUMENTS

| | | | | |
|---|---|---|---|---|
| 5,299,148 A | * | 3/1994 | Gardner et al. | 342/378 |
| 5,706,402 A | * | 1/1998 | Bell | 395/23 |
| 5,959,966 A | | 9/1999 | Torkkola | |
| 6,310,704 B1 | * | 10/2001 | Dogan et al. | 359/127 |

FOREIGN PATENT DOCUMENTS

| | | |
|---|---|---|
| WO | 9708849 | 3/1997 |
| WO | 9818271 | 4/1998 |

OTHER PUBLICATIONS

Owechko, Y., "Hybrid ICA/classical adaptive beamforming for self-organizing collaborative wireless networks" Second International Workshop on Independent Component Analysis and Blind Signal Separation, Jun. 19–22, 2000, pp. 303–308, XP001058231, Helsinki Finland.

Evans, J.B., et al. "The Rapidly Deployable Radio Network" IEEE Journal on Selected Areas in Communications, IEEE Inc., New York, US, vol. 17, No. 4, Apr. 1999, pp. 689–703, XP000824312.

* cited by examiner

Primary Examiner—Theodore M. Blum
(74) Attorney, Agent, or Firm—Tope-McKay & Associates

(57) ABSTRACT

An adaptive antenna beamformer is presented, said beamformer including a first signal source 100 and a second signal source 102 and an ambient noise or other interfering signals source 106, which are exposed to an antenna array 104. The mixed signals 108 are provided to a blind source separation processor 110. The blind separation processor 110, in this case an Independent Component Analysis element, is comprised of a group of processes that are configured to separate mixtures of signals blindly. The blind separation processor 110, provides three outputs, a first signal output 112, a second signal output 114, and a third signal output 116. The signal outputs each correspond to their respective signal input.

27 Claims, 4 Drawing Sheets

COOPERATIVE MOBILE ANTENNA SYSTEM

CLAIM OF PRIORITY

This application claims the benefit of provisional application No. 60/185,903, titled COOPERATIVE MOBILE ANTENNA SYSTEM, filed Feb. 29, 2000 in the United States Patent and Trademark Office.

TECHNICAL FIELD

The present invention relates generally to antenna-based communications and more particularly to antenna-array based communication systems.

BACKGROUND

Signal-sensing arrays find applications in many areas, including noise suppression, signal enhancement, and selective signal extraction. Most sensing arrays are placed on a platform, or equivalent structure, and are separated by a known and predictable distance. The signal of interest has a first source of origin, which is physically different than that of interference signals and noise signals. By taking note of the shift in time from when the signals hit the first array sensor to the time when the signals hit the last array sensor it is possible to selectively amplify or attenuate signal components having different physical origins. Not uncommonly in the realm of radio frequencies, platforms are equipped with an array of antennas that are separated by a ¼ wavelength, or other predefined distance that is particularly suited for the anticipated application. Such systems are effective not simply as a means for isolating signals that are received; they also find application as a means for promoting effective directional signal transmission, achieving increased data-target specificity, and utilizing less power for data delivery.

In many situations the platforms upon which antennas are positioned are unwieldy and difficult to move. Further, in hostile environments, such as mountain ranges, glaciers, or areas where conventional vehicular access is difficult or impossible, platform based antenna arrays are not practicable. Naturally it is often in these environments where antenna arrays would be most useful. The battlefield environment is another area where antenna arrays find application. Terrestrial impediments result in signal scattering, multi-path fading problems, and intentional and unintentional jamming by other signals. Additionally, in hostile settings such as the battlefield, an antenna array may present an easy target for destruction by an adversary. Finally, in all applications, existing arrays are difficult to transport and use in remote environments. Thus, to be fully effective, an array will often need to be transported in disassembled form and reassembled at the destination before being used. This can cause hardship to prospective users, who may effectively be denied communication services for a time and exposed to the environment during the assembly process.

Therefore there is a need for an antenna array that can be easily transported, is functionally robust, difficult to destroy, and is suitable for use in a dynamic environment.

SUMMARY OF THE INVENTION

The present invention provides an antenna array that can be easily transported, is functionally robust, difficult to destroy, and is suitable for use in a dynamic environment.

The present invention allows an ad-hoc assembly of the array elements to form a functional antenna array. The ad-hoc structure allows each antenna to be in a different, non-immediate, location and yet allows the antennas to cooperate, and form a functional array.

One embodiment of the present invention includes a plurality of local nodes, which are configured to receive and transmit electromagnetic radiation on at least one channel. A blind source separation element is operatively interconnected to the plurality of local nodes. This blind source separation element may be physically located, at a central location, within one of the nodes, or distributed among a plurality of nodes. In the latter case, a central processor could utilize a plurality of nodes' computational resources. Further there is a host node, which is a distance from the plurality of nodes. The host node is communicatively linked with the plurality of local nodes and is configured to receive and transmit electromagnetic radiation on at least one channel. The transmitted electromagnetic radiation initially, and at periodic intervals thereafter, will include a reference signal. The host node is configured to send a reference signal to the plurality of local nodes and the local nodes are configured to utilize the reference signal as a means for configuring the blind source separation unit so that the nodes can separate incoming signals and selectively isolate the incoming signals from the host node. Finally the plurality of nodes can directionally transmit data signals to, and receive data signals from the host node utilizing blind beamforming techniques.

In another embodiment of the present invention, the first plurality of local nodes are in an organized static array. In this situation the nodes would be positioned once and allowed to remain statically in position. Alternatively the nodes could be in an organized dynamic array, a random static array, and a random dynamic array, or transition from one configuration to another in real time.

In another embodiment of the invention the host node is locally interfaced with a second plurality of nodes, and one of the first plurality of local nodes serves as a host node to the second plurality nodes. Thus host node also belongs to an antenna array.

In another embodiment of the present invention the reference signal is utilized to optimize the performance of the blind source separation element and a plurality of beamforming coefficients are developed by the first plurality of local nodes using the reference signal, and the plurality of beamforming coefficients are utilized by the first plurality of local nodes to form a virtual antenna array, whereby the first plurality local nodes directionally receive or transmit electromagnetic radiation.

In another embodiment of the present invention the reference signal is optimized, such that the Blind Source Separation processor can achieve algorithm convergence quickly and the first plurality of local nodes can adapt to changing reception patterns and relative motion effects quickly.

In yet another embodiment of the present invention the electromagnetic radiation containing a data signal is transmitted and received until the quality of the data signal drops below a predefined threshold, at which time a new reference signal is transmitted. This embodiment would find particular application in situations where the nodes are in motion either relative to one another, or movement of the host node. Naturally, relative motion, with respect to the host node would not preclude the host node from moving, or both the host node and the first plurality of local nodes, or just the first plurality of local nodes.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

Figure 1:
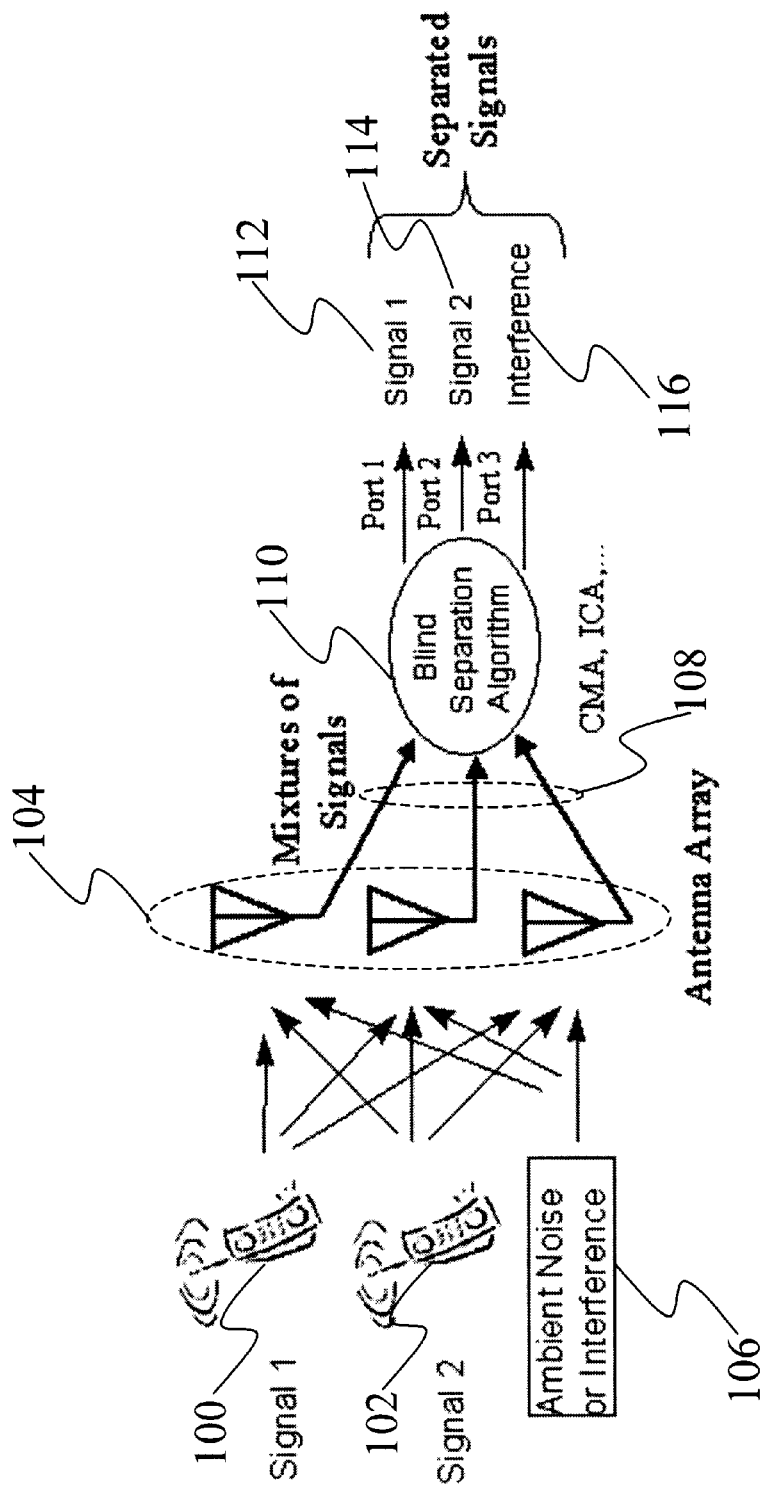
FIG. 1 is an illustration of the adaptive antenna beamformer based on Independent Component Analysis.

The present invention provides a method and apparatus that provide a cooperative mobile antenna system. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

The present invention provides a method and apparatus configured to allow a plurality, or a local group, of antennas to cooperatively receive and transmit signals. If an antenna experiences motion relative to another antenna, or to its data-target, the relative motion can be automatically compensated for without the need for knowledge or measurement of the antennas' positions or trajectories. This is done using a combination of a blind source separation (BSS) algorithm based on independent component analysis (ICA) and a reference signal transmitted by the remote unit with which the local group wishes to communicate.

A feature of the invention lies in using the reference signal to optimize the performance of the BSS algorithm. The beamforming coefficients for the virtual antenna array formed by the local group using the reference signal can then be used to transmit or receive the information-bearing signal. By using optimized reference signals, the BSS algorithm can converge using a much smaller number of samples and therefore can adapt to the changing communication channel and relative motion effects very quickly. The information signals are then transmitted or received until the channel changes sufficiently that a new reference signal block must be sent. In this way a local group of mobile units, each of which contains a simple transceiver and antenna, can be formed into a virtual antenna array which can combine the power and antenna spatial diversity resources of the local group in order to communicate with a far-away unit or host. Since the source separation algorithm is "blind", no knowledge of the positions of the mobile units is required. This invention does require that the host unit be cooperative, or transmit a reference signal.

This capability for cooperative communication, in which the antenna beamforming resources of multiple mobile units are combined in order to achieve common goals, has many advantages for ad hoc wireless networks, including tactical and surveillance applications. It also allows for enhanced communication by local mobile groups with satellites.

A system of cooperative antennas allows ad hoc networks of mobile units to share communication resources, including battery power and spatial diversity, by forming ad hoc virtual antenna arrays for enhanced antenna gain and interference suppression. The virtual antenna array can then be used for accomplishing common goals of the local group of mobile units, such as communicating with a far-off host. By sharing resources among the group, each mobile unit can reduce its power requirements and extend battery life.

This invention finds particular application in ad hoc networks of mobile wireless transceivers that need to communicate with distant hosts or base-stations. For example, the invention would enhance communication between tactical battlefield units and headquarters. Distributed ad hoc arrays of micro-sensors could use cooperative antennas to communicate with an overhead Unmanned Aerial Vehicle (UAV), aircraft, or satellite. Cell phones could poll nearby phones for unused antenna resources and if they are available, use them to communicate with the cell site base-station. Unused antenna resources on cars traveling together on the freeway could be combined and used to communicate with satellites or local base-stations or local wireless Internet servers. Nodes in indoor wireless networks could cooperate in sending signals to each other, thereby reducing the effects of multi-path and attenuation due to walls and other obstacles. In short, this invention contributes to a new paradigm for wireless communications in which ad hoc wireless networks allow the sharing of antenna resources among the nodes of the network. This additional degree of freedom suggests major ramifications for military and commercial wireless networks. This invention fits into the "software radio" concept in that it enables additional programmability and flexibility in terms of cooperation between multiple radios in an ad hoc wireless network.

Existing systems have uniformly failed to effectively combine multiple mobile antennas into a single virtual antenna array, which can be used by all of the cooperating mobile units. Many adaptive beamforming systems have been proposed and demonstrated for "real" antenna arrays in which all of the antenna elements are mounted rigidly on a common platform. In these systems the antenna elements are permanently dedicated to the platform's transceiver and cannot be shared with other mobile units. Some existing adaptive beamforming techniques use gradient descent to minimize an error signal formed using a training signal. These techniques are iterative and the number of iterations depends on the nature of the changing channel. This is disadvantageous in two ways: first, the time to convergence can be long, which prevents real-time compensation for variations due to motion and, second, the convergence time can be unpredictable. In addition, many adaptive beamforming algorithms require calibrated antenna arrays where the angular response of the array is known. Thus, using presently available adaptive beamforming techniques, small lightweight mobile units cannot benefit from the advantages of phased-array antennas. In the present invention an adaptive beamformer is described which is based on independent component analysis (ICA), which utilizes statistical independence of the radio emitters rather than an error signal to separate sources. By performing ICA on reference signals emitted by the sources, which are optimized for ICA, the number of time samples needed is minimized and the calculations can be made deterministically (non-iteratively).

Another advantage is that demixing coefficients are calculated for all sources simultaneously. This allows small mobile wireless units to combine their antenna and battery resources to rapidly form a virtual phased-array antenna and communicate with multiple units simultaneously. Calibration of the virtual array is not required.

A key element of the present invention calls for the implementation of a "virtual" adaptive antenna beamformer formed using a local group of cooperating mobile transceivers, each with its own antenna, in order to communicate with target transceivers. The system utilizes ICA (independent component analysis) to separate mixtures of reference signals emitted by the target transceivers. By optimizing the reference signals for ICA, rapid beamforming can be accomplished. In this context beamforming relates to the rapid separation of the signal mixtures. The signal of interest can then be isolated from other signals and interference sources. If the separation is accomplished much faster than the communication channel is changing (due to motion between the transceivers, for example), then the transceivers can switch to transmitting information-bearing signals which can be separated by the beamformer using the same antenna coefficients that were calculated using the references. The coefficients can then be refreshed using the references again once the antenna pattern deteriorates because the channels have changed too much.

An adaptive antenna beamformer based on ICA according to the present invention is shown in FIG. 1. A first signal source 100 and a second signal source 102 provide signals to an antenna array 104. Additionally there are ambient noise signals or other interfering signals 106, which are also exposed to the antenna array 104. The mixed signals 108 are provided to a blind separation algorithm 110, such as Constant Modulus Analysis (CMA) or ICA. The blind separation algorithm 110, in this case an ICA element, is comprised of a group of algorithms which are configured to separate mixtures of signals blindly, in other words with minimal knowledge of the signals or mixing matrix. The primary assumption, in the separation step, is that the signals forming the mixtures are statistically independent. The blind separation algorithm 110 provides three outputs, a first signal output 112, a second signal output 114, and a third signal output 116, wherein the output signals each correspond to their respective input signal. The ICA is but one example of an implementation of the blind separation algorithm 110. A plurality of different ICA algorithms exist in the literature. An acceptable ICA algorithm for illustrative purposes would include JADE (joint approximate diagonalization of eigenmatrices). The JADE algorithm is set forth in J. F. Cardoso and A. Souloumiac, in "Blind Beamforming for non-Gaussian Signals", in IEEE Proceedings-F, 140(6): 362–370, December 1993, which is herein incorporated by reference. Signals from different sources can be modeled as plane waves with different angles of arrival, which induce signals with different phase factors in the antenna elements. JADE calculates an estimate for the mixing matrix using only received mixed signals and assumptions of statistical independence of the signal sources. The pseudo-inverse of this estimated mixing matrix are the complex antenna weighting coefficients, which determine the antenna's angular response pattern. Nulls in the antenna pattern are aligned along directions of interference, allowing the desired signal to be selectively separated. An advantage of JADE is that it is non-iterative and robust. However it is not the only ICA algorithm that could be used with the present invention. It is used herein for illustrative purposes only.

Conventionally ICA has been used assuming very little knowledge of the source signals (i.e. blind beamforming), other than the assumption of statistical independence. In addition, the published literature has assumed conventional antenna arrays in which the antenna element positions are fixed relative to one another with spacing of 1 wavelength or less and mounted on the same platform. In many new applications involving ad hoc wireless networks of simple mobile nodes, it is desirable to share antenna and battery resources by allowing groups of mobile nodes, each with a simple antenna, to form virtual antenna phased arrays. This would allow groups of nodes to combine their resources in order to communicate with a distant unit. Since sharing of data and phase information among the local nodes requires much less power than communicating with a distant unit, the net savings in resources would be large.

Figure 2:
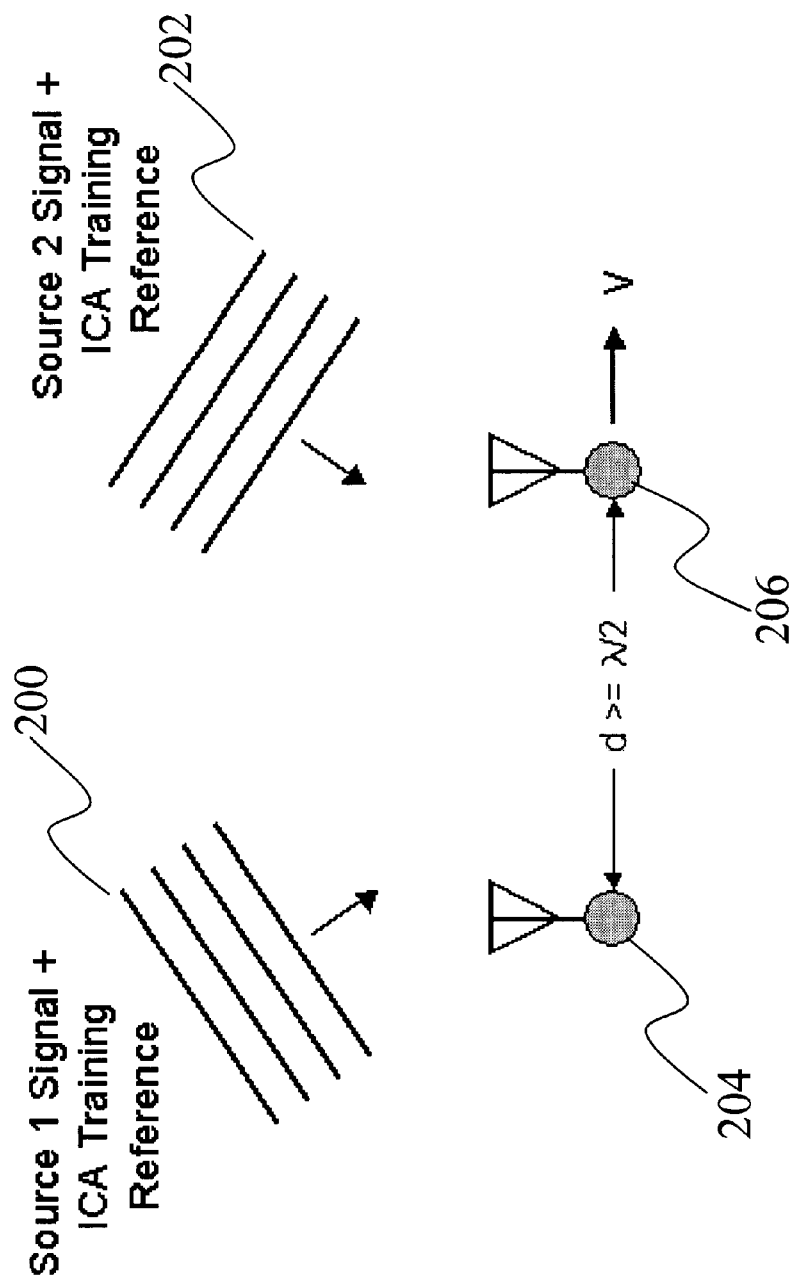
FIG. 2 is an illustration depicting the basic concept of the invention: rapid beamforming using mobile antenna elements.
Figure 3:
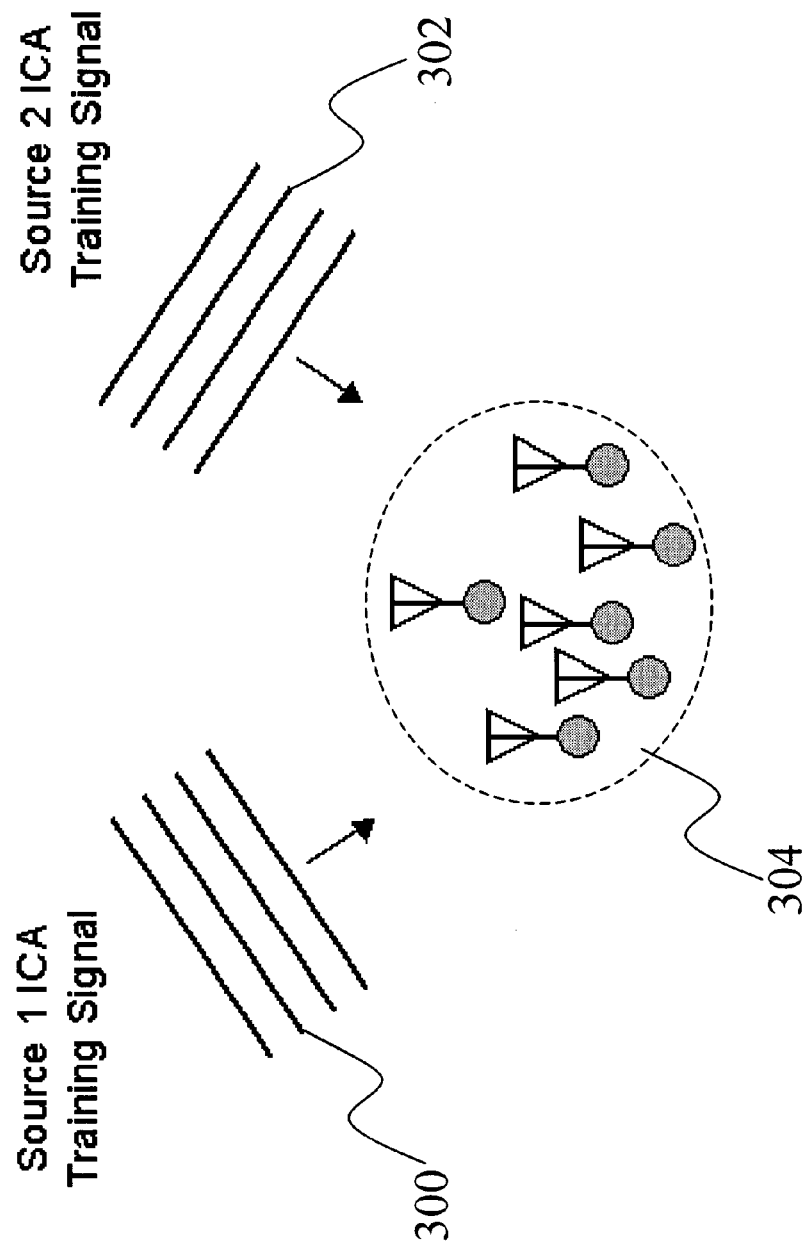
FIG. 3 is an illustration depicting the virtual antenna array formed from multiple mobile units in an ad hoc wireless network.

It is difficult to form such virtual antenna arrays using conventional beamforming methods. Relative motion between participating nodes results in phase shifts which must require compensation. The compensation must be fast enough to follow the phase shifts. Both conventional implementations of ICA and conventional beamforming methods are not fast enough to compensate even small amounts of motion in real-time. However, in many applications the nodes need to communicate with a distant unit, which is friendly and cooperative. This means that a reference or training signal optimized for fast ICA adaptation can be emitted by the distant unit to help compensate for relative motion and to allow the local nodes to form a virtual array. This is shown in FIG. 2, where the key idea is to use training signals designed for rapid adaptation of an ICA, using a small number of time samples. This allows the antenna coefficients to adapt in real time to phase shifts due to motion or environmental changes. A wavefront from a first signal source 200 includes a first ICA training reference signal. Similarly a wavefront from a second signal source 202 includes a second ICA training reference signal. A first antenna 204 moves relative to the signal sources and a second antenna 206. The antennas are separated by a distance of at least half a wavelength Existing reference-based conventional beamforming methods are not fast enough to compensate for node motion because a large number of time samples must be gathered. The present invention provides ICA methods that can successfully beamform using as little as 100 time samples if optimized references are used. By using a small number of reference samples, ICA beamforming can form a virtual antenna array rapidly enough to compensate for motion effects in real-time. This is depicted in FIG. 3, where antenna gain, spatial diversity, and battery power of multiple mobile units can be pooled by forming a virtual antenna array, thereby increasing the datalink bandwidth. In FIG. 3 a wavefront from a first signal source 300 includes a first ICA training signal. Similarly a wavefront from a second signal source 302 includes a second ICA training signal, and a plurality of antennas 304, which in the aggregate, form a virtual antenna array. The virtual antenna array formed from multiple mobile antennas units in an ad hoc wireless network serves as an alternative to more conventional, less flexible arrays.

Figure 4:
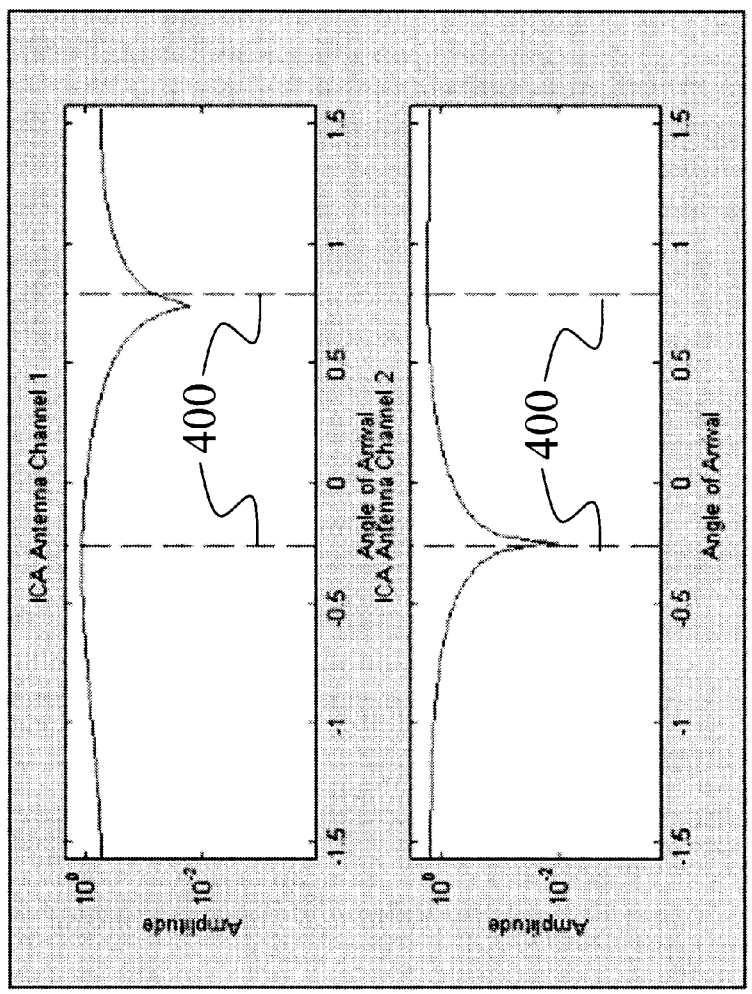
FIG. 4 is a graph of the antenna angular response patterns calculated using reference-based JADE ICA, where the dashed lines indicate the angles of arrival at the two sources; the antenna nulls are not perfectly aligned with the sources because the references were not optimized.

An example of an antenna angular response pattern assuming two sources and two antenna elements is shown in FIG. 4. The dashed lines 400 indicate the angles of arrival of the two sources. The antenna nulls are not perfectly aligned with the sources because the references were not optimized. The reference signals were designed to have non-zero kurtosis, which makes it easier to separate mixtures of the references. The array weights were calculated using only 100 time samples of the reference signals.

An important issue in ICA is port swapping. After each update, there is no guarantee that the same signal will always appear on the same output port due to the nature of ICA. Therefore it is important to include port tracking as part of the ICA algorithm. In these examples tracking was based on the kurtosis and mean frequency of the output signals.

Optimization of the reference signals involves satisfying a number of criteria, including:

1. The references should experience the same environmental conditions as the data signals. This is automatically accomplished if the distant transceiver transmits both the reference and the data. The reference and data signals can be time-, frequency-, or code-multiplexed.
2. The references should be statistically independent.
3. The references should have nonzero kurtosis (non-gaussian statistics).
4. The references should be locally stationary in the statistical sense.
5. Ideally, the references should have low bandwidth so as to minimize spectrum usage.

Timing synchronization of the local nodes and local communication is a consideration that should not be neglected. The nodes can be synchronized by phase-locking to the reference signals or using accurate local clocks. A local processor will need to gather the signal mixtures from the nodes and perform ICA. The separated signals will then be routed to their appropriate destinations. In transmit mode, the separate data channels will need to be routed to the proper nodes along with the correct antenna coefficients. The overhead costs for the local communication will be small because the communication is over relatively short distances. In addition, a "wave" type of communication can be employed in which each node sends messages only to its nearest neighbors.

What is claimed is:

1. A cooperative mobile antenna apparatus comprising:
   i. a first plurality of independently mobile local nodes configured to receive and transmit electromagnetic radiation on at least one channel;
   ii. a blind source separation element, having a processor and operatively interconnected to the plurality of local nodes; and
   iii. a host node configured to receive and transmit electromagnetic radiation on at least one channel, wherein the electromagnetic radiation includes a reference signal, where the host node is communicatively linked with the plurality of local nodes;
   wherein the host node is configured to send a training or reference signal to the plurality of mobile local nodes; and wherein the first plurality of mobile local nodes are configured to utilize the training or reference signal as a means for configuring the blind source separation element so that the nodes can separate incoming signals and selectively isolate the incoming signals from the host node and directionally transmit data signals to and receive data signals from the host node utilizing blind beamforming techniques.

2. A cooperative mobile antenna apparatus as set forth in claim 1, wherein the first plurality of local nodes are organized into a configuration selected from the group consisting of an organized static array, an organized dynamic array, a random static array, and a random dynamic array, and wherein the first plurality of local nodes may transition from one configuration to another in real time.

3. A cooperative mobile antenna apparatus as set forth in claim 1, wherein the host node is locally interfaced with a second plurality of nodes, and one of the first plurality of local nodes serves as a host node to the second plurality nodes.

4. A cooperative mobile antenna apparatus as set forth in claim 1, wherein the blind source separation element is comprised of a joint approximate diagonalization of eigenmatrices independent component analysis algorithm.

5. A cooperative mobile antenna apparatus as set forth in claim 1, wherein the identified and selectively isolated signals are routed to appropriate destinations within the first plurality of local nodes.

6. A cooperative mobile antenna apparatus as set forth in claim 1, wherein when the local nodes are transmitting, the separate data channels are routed to the proper nodes from the blind source separation along with correct antenna coefficients.

7. A cooperative mobile antenna apparatus as set forth in claim 1, wherein overhead costs for the local communication between local nodes in the first plurality of nodes is less than overhead costs for communication between a local node in the first plurality of nodes and a host node.

8. A cooperative mobile antenna apparatus as set forth in claim 7, wherein the first plurality of nodes communicate with one another and each node sends messages only to its nearest neighbors.

9. A cooperative mobile antenna apparatus as set forth in claim 1, wherein the reference signal is utilized to optimize the performance of the Blind Source Separation processor; and
   wherein a plurality of beamforming coefficients are developed by the first plurality of local nodes using the reference signal, and
   wherein the plurality of beamforming coefficients are utilized by the first plurality of local nodes to form a virtual antenna array;
   whereby the first plurality local nodes directionally receive or transmit electromagnetic radiation.

10. A cooperative mobile antenna apparatus as set forth in claim 1, wherein, the reference signal is optimized, such that the Blind Source Separation processor can achieve convergence quickly; and
    whereby the first plurality of local nodes can adapt to changing reception patterns and relative motion effects quickly.

11. A cooperative mobile antenna apparatus as set forth in claim 1, wherein electromagnetic radiation containing data signal is transmitted and received until the quality of the data signals drops below a predefined threshold, at which time a new reference signal is transmitted.

12. A cooperative mobile antenna apparatus as set forth in claim 1, wherein the reference signal is optimized, to facilitate the rapid convergence in the blind source separation element;
    whereby the blind source separation element can adapt to changed communication channels and relative motion effects very quickly.

13. A cooperative mobile antenna apparatus as set forth in claim 12, wherein the optimization of the reference signals involves satisfying a number of criteria, including at least one of the following:
    i. ensuring that the reference signals experiences the same environmental conditions as the data signals;
    ii. providing reference signals that are statistically independent;
    iii. providing reference signals that have nonzero kurtosis;
    iv. providing reference signals that are locally stationary in the statistical sense;
    v. providing reference signals that have low bandwidth requirements.

14. A method for forming a virtual antenna array comprising:
  i. providing a first plurality of local nodes configured to receive and transmit electromagnetic radiation;
  ii. providing a host node configured to receive and transmit electromagnetic radiation;
  iii. providing a blind source separation element operatively interconnected to the plurality of local nodes;
  wherein the host node is configured to send a training or reference signal to the plurality of local nodes; and
  wherein the first plurality of local nodes are configured to utilize the training or reference signal as a means for determining their orientation and position relative to the host node so that they can identify and selectively isolate incoming signals from the host node and transmit to the host node utilizing beamforming techniques.

15. A method for forming a virtual antenna array as set forth in claim 14, wherein the first plurality of local nodes are organized, at any given time interval, in one of the following manners:
  i. an organized static array;
  ii. an organized dynamic array;
  iii. a random static array;
  iv. a random dynamic array;
  wherein the dynamic arrays may transition from organized to random or from random to organized in real time.

16. A method for forming a virtual antenna array as set forth in claim 14, wherein the host node is locally interfaced with a second plurality of nodes, and one of the first plurality of local nodes serves as a host node to the second plurality nodes.

17. A method for forming a virtual antenna array as set forth in claim 14, wherein the blind source separation element is comprised of a joint approximate diagonalization of eigenmatrices independent component analysis algorithm.

18. A method for forming a virtual antenna array as set forth in claim 14, wherein the identified and selectively isolated signals are routed to appropriate destinations within the first plurality of local nodes.

19. A method for forming a virtual antenna array as set forth in claim 14, wherein when the local nodes are transmitting; the separate data channels are routed to a subset of nodes from the blind source separation along with correct antenna coefficients.

20. A method for forming a virtual antenna array as set forth in claim 14, wherein the overhead costs for the local communication between the a first plurality of local nodes are small because the communication is over relatively short distances.

21. A method for forming a virtual antenna array as set forth in claim 20, wherein node-to-node propagation communication is employed for the local communication among the a first plurality of local nodes, wherein each node sends messages only to its nearest neighbors.

22. A method for forming a virtual antenna array as set forth in claim 14, wherein the reference signal is utilized to optimize the performance of the blind source separation element and wherein a plurality of beamforming coefficients for a virtual antenna array formed by the first plurality of local nodes using the reference signal, can then be used to transmit or receive information-bearing signals.

23. A method for forming a virtual antenna array as set forth in claim 14, wherein, by utilizing optimized reference signals, and the blind source separation element can converge using a relatively small number of samples and therefore can adapt to changing reception patterns and relative motion effects very quickly.

24. A method for forming a virtual antenna array as set forth in claim 14, wherein information signals are transmitted and received until the quality of signal drops below a predefined level at which time a new reference signal block is sent.

25. A method for forming a virtual antenna array as set forth in claim 14, wherein the reference signal is optimized, to facilitate the rapid convergence of the blind source separation element;
  whereby the blind source separation algorithm can adapt to changing communication channels and relative motion effects very quickly.

26. A method for forming a virtual antenna array as set forth in claim 25, wherein the optimization of the reference signals involves satisfying a number of criteria, including at least one of the following:
  1. ensuring that the references experiences the same environmental conditions as the data signals;
  2. providing reference signals that are statistically independent;
  3. providing reference signals that have nonzero kurtosis;
  4. providing reference signals that are locally stationary in the statistical sense;
  5. providing reference signals that have low bandwidth requirements.

27. A method for forming a virtual antenna array as set forth in claim 14, wherein the the nodes periodically provide updates of their relative locations and wherein after each update, a port tracking protocol is utilized to assist with blind the source separation element.

* * * * *